United States Patent [19]

Al-Attar

[11] Patent Number: 5,353,241
[45] Date of Patent: Oct. 4, 1994

[54] SHIFTING SYSTEM AND METHOD FOR AN ELECTRONIC COMPASS SYSTEM

[76] Inventor: Rafi A. Al-Attar, 2325 Atlas Dr., Troy, Mich. 48083

[21] Appl. No.: 815,267

[22] Filed: Dec. 27, 1991

[51] Int. Cl.$^5$ .............................................. G01C 17/38
[52] U.S. Cl. .................. 364/571.01; 364/449; 33/361
[58] Field of Search .............. 364/559, 571.01, 571.03; 73/1 E; 33/363 Q, 363 R, 355 R, 356, 361

[56] References Cited

U.S. PATENT DOCUMENTS

| | | | |
|---|---|---|---|
| 3,899,834 | 8/1975 | Harrison, Jr. | 33/352 |
| 3,991,361 | 11/1976 | Mattern et al. | 324/244 |
| 4,424,631 | 1/1984 | Franks | 33/361 |
| 4,425,717 | 1/1984 | Marcus | 33/361 |
| 4,505,054 | 3/1985 | Clark et al. | 33/357 |
| 4,546,551 | 10/1985 | Franks | 33/356 |
| 4,622,646 | 11/1986 | Waller et al. | 364/571.02 |
| 4,622,843 | 11/1986 | Hormel | 73/1 E |
| 4,677,381 | 6/1987 | Geerlings | 324/253 |
| 4,698,912 | 10/1987 | Fowler et al. | 33/356 |
| 4,750,349 | 6/1988 | Luitje | 73/1 E |
| 4,807,462 | 2/1989 | Al-Attar | 73/1 E |

FOREIGN PATENT DOCUMENTS 60-135814 7/1985 Japan .
2056686 3/1981 United Kingdom .

Primary Examiner—Thomas G. Black
Assistant Examiner—Michael Zanelli

[57] ABSTRACT

A shifting compensation circuit which employs a ranging circuit having a variable direct voltage source, to compensate for abnormally large vehicle magnetic fields. A ranging circuit is coupled between a microcomputer and a flux-gate. The microcomputer monitors the output of an integrator through a buffer amplifier to minimize variations in the integrator output caused by temperature variations, and directs the variable direct voltage source to add a direct voltage reference, in opposition to the vehicle's magnetic field signal and within the output voltage range of the integrator, to the output signal of the flux-gate, such that the combination of the two signals is within the output voltage range of the integrator for all vehicle headings.

7 Claims, 4 Drawing Sheets $\vec{V_N} = \vec{V} + \vec{V_c}$

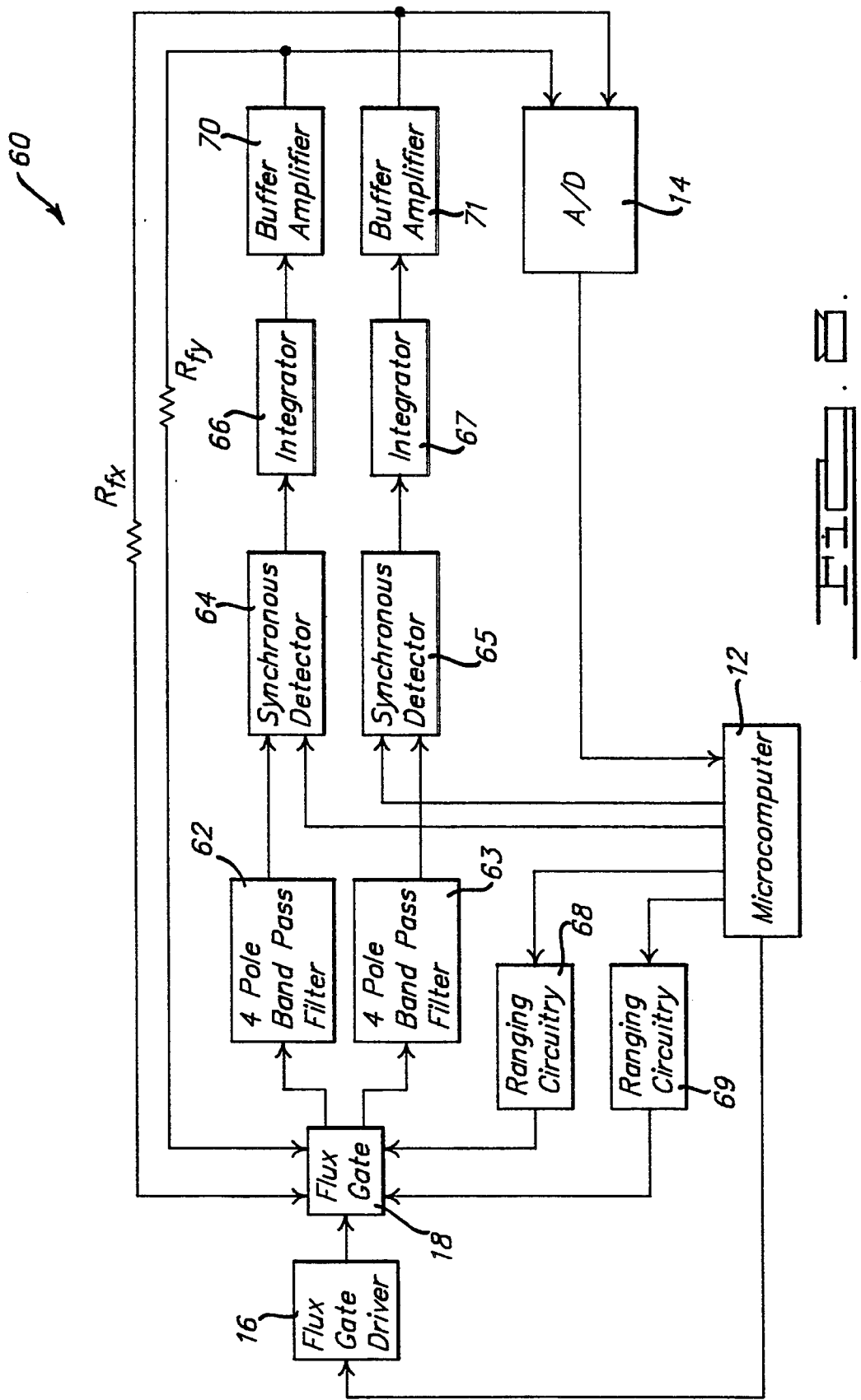

SHIFTING SYSTEM AND METHOD FOR AN ELECTRONIC COMPASS SYSTEM

BACKGROUND OF THE INVENTION

1. Technical Field

The present invention relates to electronic compasses, and more specifically to a method for compensating for excess vehicle magnetic fields in an electronic compass.

2. Discussion

The present invention is related to and is an improvement of U.S. Pat. No. 4,622,843 to Hormel issued Nov. 18, 1986 and entitled "Simplified Calibration Technique and Auto Ranging Circuit for an Electronic Compass Control Circuit". The present invention is also related to U.S. Pat. No. 4,807,462 issued Feb. 28, 1989, to Rafi A. Al-Attar and entitled "Method for Performing Automatic Calibration in an Electronic Compass." The disclosures of these patents are hereby incorporated by reference.

The present invention is related to and combinable with the commonly assigned patent application "Scaling System and method for an Electronic Compass" Ser. No. 07/815,347. This application is hereby incorporated by reference.

Normally, electronic compass systems employ a magnetic flux-gate sensor. The operation of the flux-gate sensor is well documented. See "Magnetic Field Sensor and Its Application to Automobiles", SAE Paper No. 800123, pages 83-90, February, 1980, by Hisatsugu Itoh; and "A Magnetic Heading Reference for the Electro/Fluidic Autopilot" *Sport Aviation* by Doug Garner, Part I, pages 19-26, November, 1981 and Part II, pages 20-32, 51, December, 1981. The disclosures of these documents are also hereby incorporated by reference.

Electronic compasses are capable of processing ordinary vehicle and earth magnetic fields. In the '843 patent to Hormel, the output of an integrator is summed with the output of a ranging circuit, the sum is fed back to the flux-gate sensor. The feedback current reduces the output voltage of the flux-gate sensor until the microcomputer senses that the feedback current generates a magnetic field that is equal in magnitude but opposite in direction to the field sensed by the sense coils due to the external measured magnetic field (the earth and vehicle magnetic fields). The microcomputer employs a ranging technique found in commonly assigned U.S. Pat. No. 4,750,349 issued Jun. 14, 1988, to Luitje, entitled "Microcomputer Controlled Quick Ranging Technique and Digital Filter." The disclosure of this patent is also hereby incorporated by reference.

However, the primary purpose of the ranging circuit is to bring the output of the integrator into a range that can be resolved clearly by the A/D which then can feed this information to the microcomputer to handle. Therefore, the ranging circuit is not capable of compensating for abnormally large vehicle magnetic fields, making the geometric method of calibration such as the one found in the '462 patent difficult to perform, where resolving power is defined as the ability of the analog-to-digital converter to partition an analog voltage signal into distinct voltage ranges and assign a different digitized value to each ranges. The feedback current is further limited by the size of the feedback resistors, and the inherent limitations of the ranging circuit.

SUMMARY OF THE INVENTION

In accordance with the teachings of the present invention, an electronic compass system employing a shifting compensation circuit is provided. The electronic compass system generally includes a microcomputer, a flux gate, a flux-gate driver, a multiplexer, a bandpass filter, a synchronous detector, an integrator, a buffer amplifier, and a digital-to-analog converter. The shifting compensation circuit employs a ranging circuit, having a variable direct voltage source. The ranging circuit is coupled between the microcomputer and the flux-gate. The microcomputer monitors the output of the integrator through the buffer amplifier and directs the variable direct voltage source to add a direct voltage reference in opposition to the vehicle's magnetic field signal and within the output voltage range of the integrator, such that the combination of the two signals is within the output voltage range of the integrator for all vehicle headings. Thus, the shifting compensation system enhances the accuracy of the subsequently performed calibration method found in the '462 patent and the '843 patent.

BRIEF DESCRIPTION OF THE DRAWINGS

Other objects and advantages will become apparent upon reading the following detailed description and upon reference to the drawings, in which:

FIG. 8 is a block diagram an electronic compass incorporating a second embodiment of the present invention.

DETAILED DESCRIPTION OF THE PREFERRED EMBODIMENTS

Figure 1:
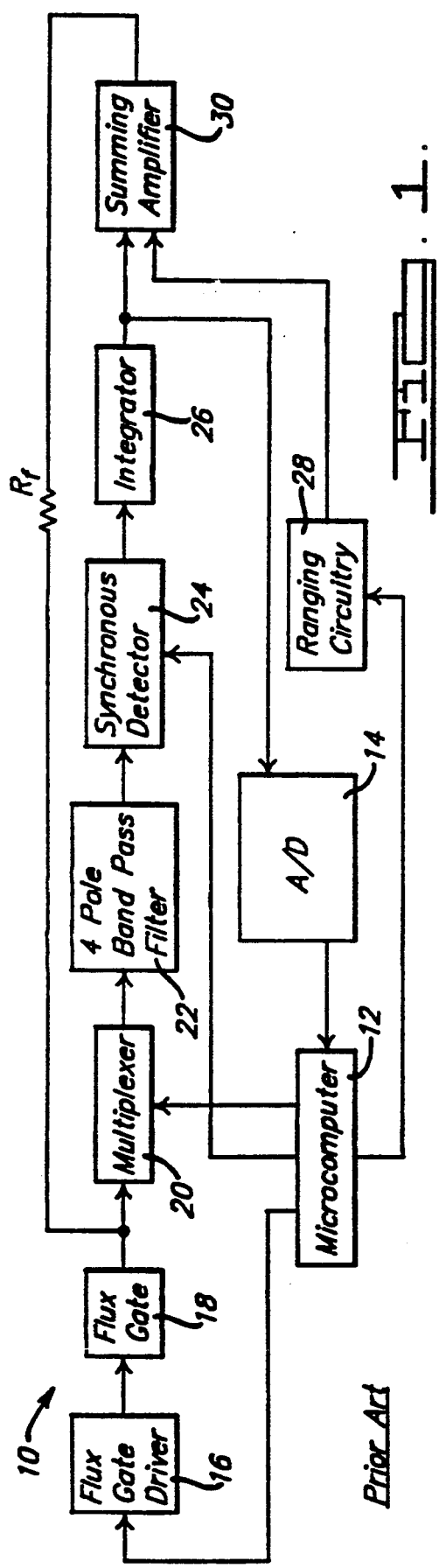
FIG. 1 is a block diagram of the electronic compass disclosed in the '843 patent to Hormel.

Turning now to FIG. 1, there is shown a block diagram of the electronic compass system 10 of the '843 patent to Hormel. The heart of the system is a microcomputer 12 which employs an 8-bit analog-to-digital converter 14. The microcomputer 12 controls operation of the electronic compass system 10, beginning with a flux-gate driver 16. Upon receipt of a square-wave signal from the microcomputer 12, the flux-gate driver 16 adds enough drive to the signal to saturate a flux-gate 18. The operation of the flux-gate driver 16 and flux-gate 18 are explained in the documents incorporated by reference, namely "A Magnetic Heading Reference for the Electro/Fluidic Autopilot" and "Magnetic Field Sensor and its Application to Automobiles, (SAE Paper No. 800123)". The flux-gate 18 employs two sense coils oriented perpendicularly to one another. Voltages are induced across the sensor coils by the presence of the magnetic fields of the vehicle and the earth.

The voltages from the sense coils of the flux-gate 18 are selected by a multiplexer 20. The multiplexer 20 is in communication with the microcomputer 12, which generates a signal for controlling a network for switching use of a four-pole bandpass filter 22, a synchronous detector 24 and an integrator 26 periodically from one sense coil to the other. The multiplexer 20 is in communication with the four-pole bandpass filter 22, which filters out all but the second harmonic signals, whose amplitude is proportional to the earth's magnetic field.

Second harmonic signals are presented to the synchronous detector 24. The function of the synchronous detector 24 is to select the portion of the filtered signals to be integrated by the integrator 26. The output of the synchronous detector 24 is a half-wave rectified signal which is fed into the integrator 26.

The output of integrator 26 periodically switches back and forth between two DC levels corresponding to the two sense coils of the flux-gate 18. The output of integrator 26 is stabilized by feeding back a current through resistor $R_f$ to the sense coils of the flux-gate 18. The feedback current eventually generates an equal and opposite magnetic field versus that produced by the magnetic field sensed by the flux-gate 18. Therefore, the output voltages, $V_{ox}$ and $V_{oy}$, of the integrator 26 are directly proportional to the sensed magnetic field by a constant $R_f$ which is the feedback resistance:

$$V_{ox} = KR_f(\vec{V}_{mx} + \vec{R}_{mx}).$$

where $\vec{V}_{mx} + \vec{R}_{mx}$ is the geometric addition (or resultant) of the voltages caused by the magnetic fields of the earth and the vehicle in the x coil. Similarly, $$V_{oy} = KR_f(\vec{V}_{my} + \vec{R}_{my})$$

where $\vec{V}_{my} + \vec{R}_{my}$ is the geometric resultant at the magnetic field, of the earth and vehicle in the y coil, and K is a Constant (related to the physical characteristics of the flux gate 18, such as its # of turns, permeability and the gain of filter 22 and integrator 26).

The ranging circuit 28 used in the '843 patent to Hormel moves the DC levels at the integrator output closer to the origin and toward a magnitude within the window. The ranging circuit 28 generates a compensation field such that $$\vec{V}_n + \vec{R} = \vec{V} + \vec{R} + \vec{V}_c$$

or $$\vec{V}_n = \vec{V} + \vec{V}_c$$

where $\vec{V}_n$ is the new vehicle magnetic field vector voltage, $\vec{R}$ is earth's magnetic field vector voltage, and $\vec{V}_c$ is the compensation field vector voltage.

Heading information is determined from the output of the integrator 26. The microcomputer 12 is coupled to the integrator output through the 8-bit analog-to-digital converter 14. The 8-bit analog-to-digital converter 14 converts the DC levels to digital coordinates referenced to a cartesian coordinate system. The microcomputer 12 divides the y-coordinate, corresponding to the DC level from one coil, by the x-coordinate, corresponding to the other coil, and takes the arctangent of the quotient using a piece-wise-linear-function-of-x routine to yield the vehicle's heading.

The integrator 26 employs operational amplifiers which have linear voltage output ranges of approximately 0 to $V_a$ volts. In the '843 patent to Hormel, the linear voltage output range is approximately 0 to 10 volts. Since the voltages induced across the sense coils of the flux-gate 18 may be negative, these voltages must be modified for use in the integrator 26. Negative voltages are modified by tying the sense coils of the flux-gate 18 to a reference voltage of $V_{cc}$, halfway between 0 and $V_a$ volts. In the '843 patent to Hormel, $V_{cc}$ is equal to 5 volts.

The primary purpose of the ranging circuit 28 is to bring the DC output levels of the integrator 26 into a range that can be resolved by the A/D, not to compensate for abnormally large vehicle magnetic fields. It accomplishes this through the use of negative feedback through resistor $R_f$. The ranging circuit 28 monitors the output of integrator 26 (through the A/D and microcomputer) and employs a variable voltage source, having an operational amplifier, to produce the compensation voltage. The outputs of the integrator 26 and ranging circuit 28 are combined in a summing amplifier 30.

Figure 2:
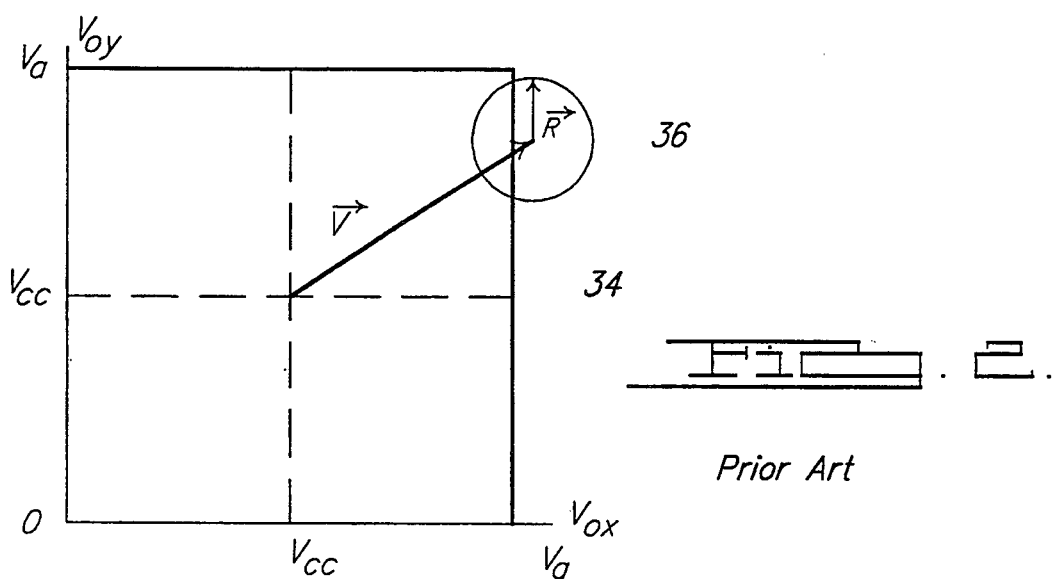
FIG. 2 is a depiction of the integrator output voltage range or "window" of the electronic compass system in the '843 patent to Hormel, showing the vehicle's and the earth's magnetic field voltage vectors $\vec{V}$ and $\vec{R}$ before compensation using the '843 compensation method.

Turning now to FIG. 2, there is shown a voltage window 34. The x and y axes correspond to the two DC output levels $V_{ox}$ and $V_{oy}$ of the integrator 26. The limits of the window 30 are determined by the output voltage range of the operational amplifiers within the integrator 26. This range is depicted as approximately 0 to $V_a$ volts. The voltage $V_{cc}$ is applied to the junction of the two sense coils and the integrator 26 and marks a reference for the origin O of the vehicle's magnetic field voltage vector $\vec{V}$.

Also shown is the earth's magnetic field voltage vector $\vec{R}$ and circle 36. The earth's magnetic field circle 36 is the locus of points described by the earth's magnetic field voltage vector $\vec{R}$ as the vehicle changes heading. The vehicle's magnetic field voltage vector $\vec{V}$ remains stationary with respect to the x and y axes, which are the frame of reference of the vehicle (and the flux-gate 18).

Figure 3A:
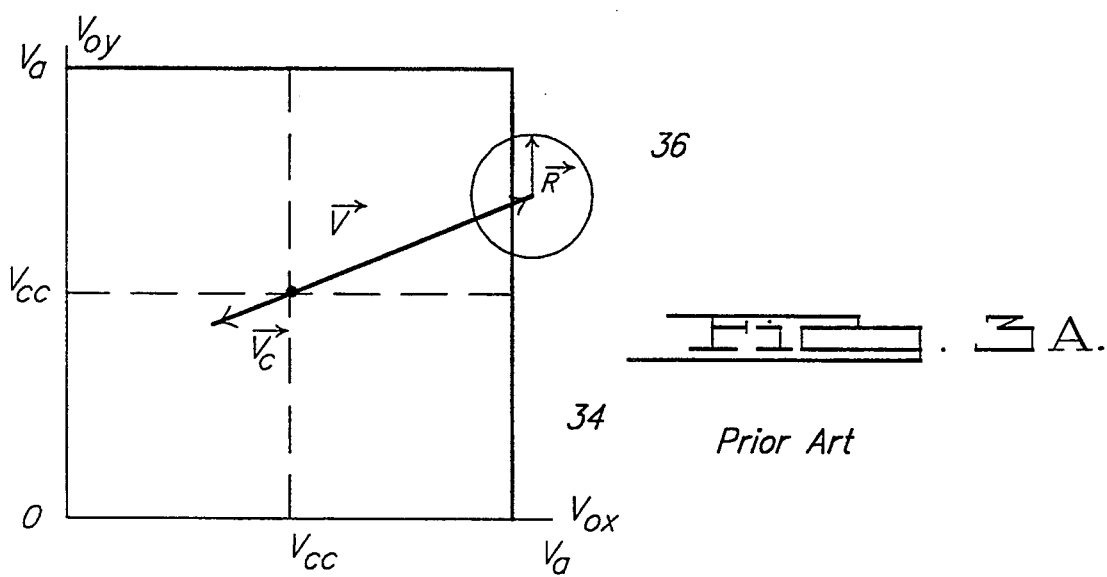
FIGS. 3A and 3B are depictions of the same window as FIG. 2, but showing the vehicle's and earth's magnetic field voltage vectors $\vec{V}$ and $\vec{R}$ after compensation using the '843 compensation method.
Figure 3B:
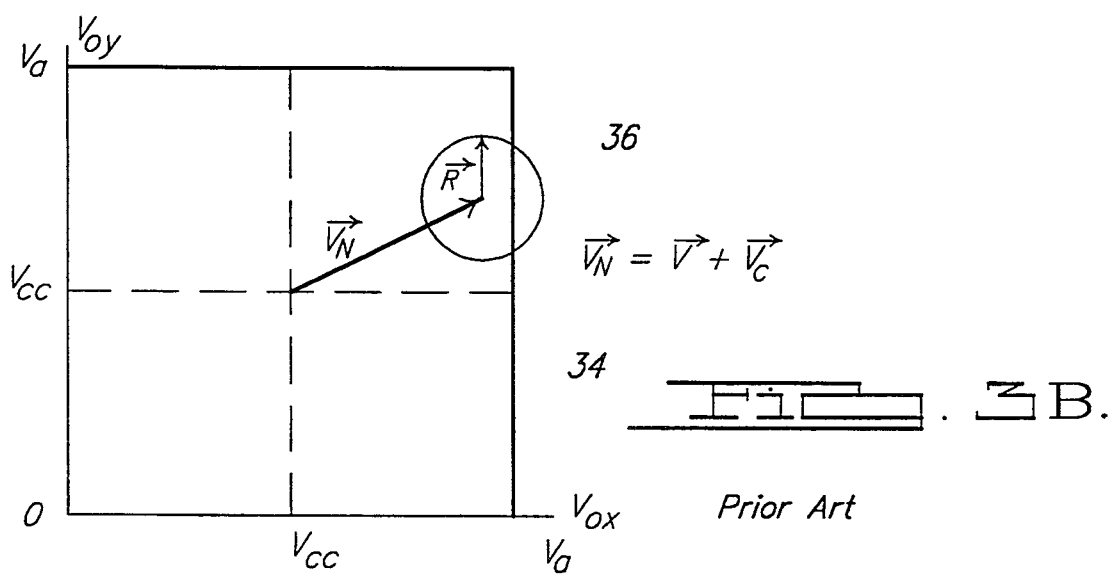

In FIGS. 3a and 3b, there is shown the window 34 of FIG. 2. However, the earth's magnetic field circle 36 has been brought partially into the window 34 by the operation of the ranging circuit 28 of the electronic compass of FIG. 1. The compensation voltage vector $\vec{V}_c$ is added to the vehicle's magnetic field voltage vector $\vec{V}$ to produce a new vehicle magnetic field voltage vector $\vec{V}_n$. The earth's magnetic field voltage vector $\vec{R}$ remains the same as before compensation.

The ranging circuit 28 in FIG. 1 is incapable of producing enough feedback current to bring the earth's magnetic field circle 36 totally within the window 34. When abnormally large vehicle magnetic fields are present, part of the earth's field circle 36 remains outside the voltage window 34 after compensation. For vehicle headings in which the earth's magnetic field voltage vector $\vec{R}$ crosses the boundaries of the window 34, the microcomputer 12 is incapable of generating accurate headings. If the earth's magnetic field circle 36 were totally outside the window 34 after compensation, then the microcomputer 12 would be incapable of generating any accurate headings, because the operational amplifiers of the integrator 26 would be in constant saturation. Thus, calibration under the method of the '462 and '843 patents would be impossible.

Figure 4:
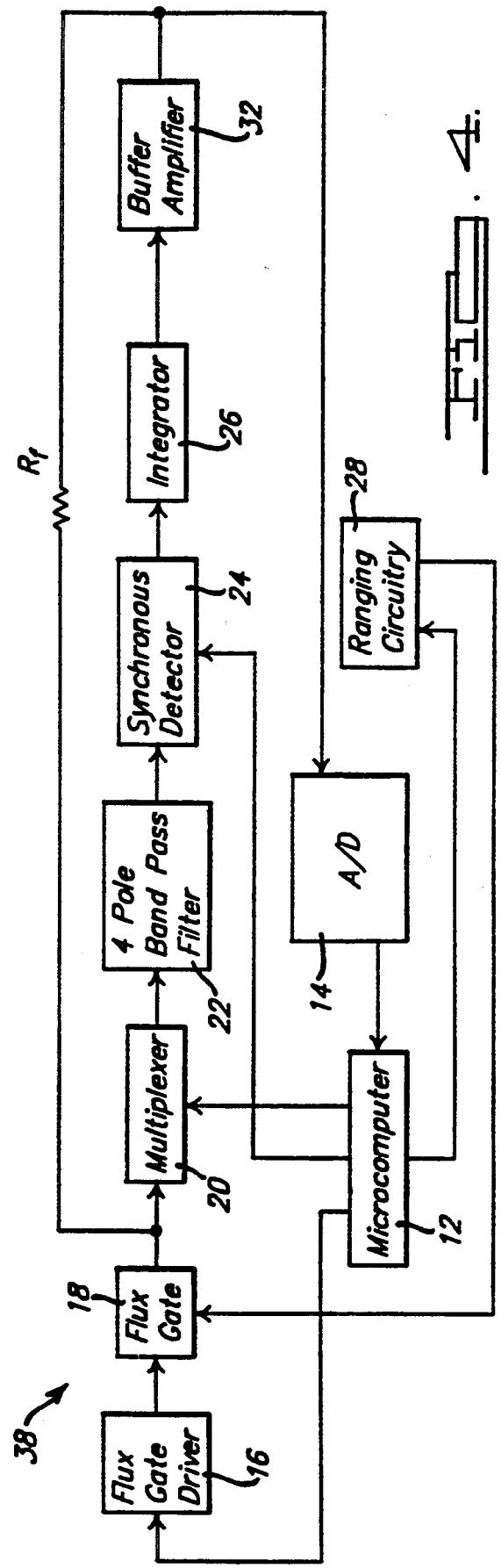
FIG. 4 is a block diagram of an electronic compass incorporating the compensation circuit of the present invention.

In FIG. 4 there is shown a block diagram of the electronic compass system 38 of the present invention. The ranging circuit 28 feeds the common junction of the sense coils of the flux-gate 18, the 4 pole bandpass filter 22 and the integrator 26. This produces a floating or shifting reference voltage $V_{ref}$ instead of a fixed voltage $V_{cc}$. The reference voltage $V_{ref}$ is controlled by the microcomputer 12 in response to the output of the integrator 26. When the operational amplifiers of the integrator 26 are in saturation, the microcomputer 12 signals the ranging circuit 28 to lower the reference voltage so as to bring the combination of the vehicle's and earth's magnetic field voltage vectors into the output voltage range of the integrator 26. Similarly, if operational amplifier output is in cutoff (near zero) then the microcomputer signals the ranging circuit 28 to raise the reference voltage so as to bring the circle 36 into the window 34. Using the method of the '349 patent, for example, the microcomputer 12 (through the analog-to-digital converter 14) monitors the DC output levels, $V_{ox}$ and $V_{oy}$, from the output of buffer amplifier 32, which corresponds to summing amplifier 30. If the microcomputer 12 senses that either voltage is high (near $V_a$) or low (near zero) then it signals the ranging circuit 28 to reduce or increase the corresponding DC output level by predetermined amounts until that DC output level is within the window 34.

Figure 5:
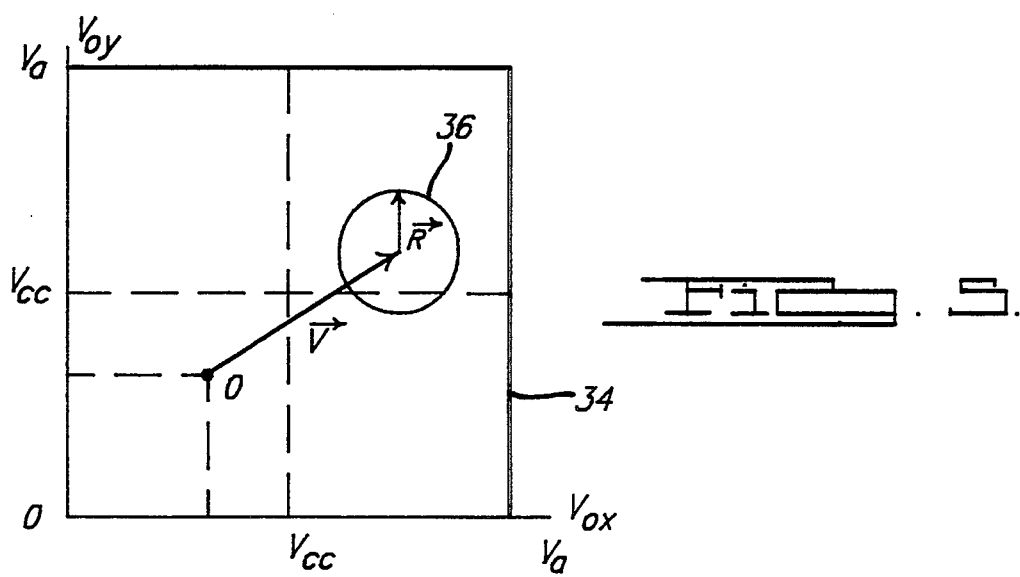
FIG. 5 is a depiction of the integrator output voltage "window" of an electronic compass system incorporating the compensation circuit of the present invention, showing the vehicle's and earth's magnetic field voltage vectors, $\vec{V}$ and $\vec{R}$ after compensation.

Turning now to FIG. 5 there is shown the voltage window 34 illustrating compensation under the present invention. The origin O of the vehicle's magnetic field vector voltage $\vec{V}$ of FIG. 2 has been shifted to a point less than $V_{cc}$ in order to bring both the vehicle's magnetic field vector voltage $\vec{V}$ and the earth's magnetic field circle 36 within the window 34. For other vehicle magnetic field vector voltage magnitudes and directions, the origin O of the vehicle's magnetic field vector voltage $\vec{V}$ can be moved anywhere within the window to bring both voltage vectors $\vec{V}$ and $\vec{R}$ into the window 34 for all vehicle headings.

Advantageously, the reference voltages for each coil and its corresponding processing circuit can be separately shifted. For each coil and its corresponding processing circuit, the microcomputer 12 lets the ranging circuit 28 generate a reference voltage that may or may not be the same for both coils and their corresponding circuits. Once the two output voltages of the ranging circuit 28 are established, the microcomputer 12 does not vary them until the earth's field circle 36 is moved outside the window 34 by some other magnetic disturbance.

Figure 6:
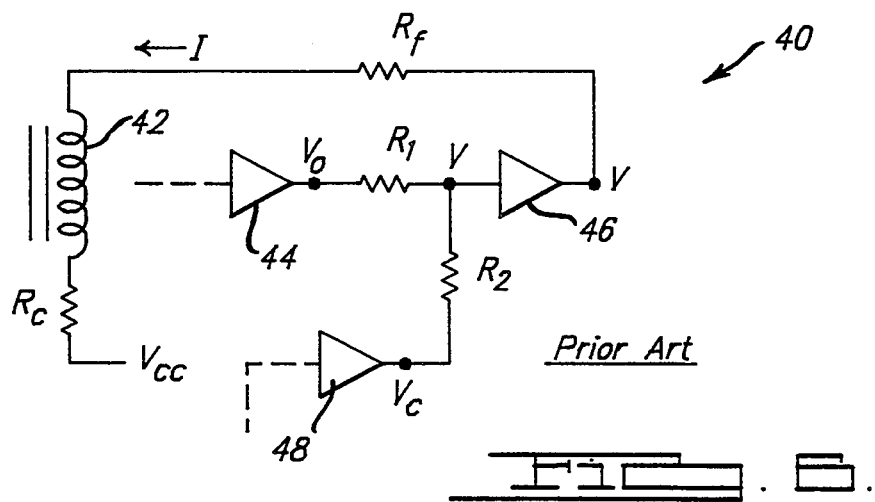
FIG. 6 is a simplified schematic diagram of the compensation circuit and connection of the electronic compass shown in FIG. 1.

Turning now to FIG. 6 there is shown a simplified schematic 40 of the compensation circuit of the '843 patent to Hormel. Sense coil 42 is one of the two sense coils of the flux-gate 18. The multiplexer 20 allows both sense coils to use the same circuit 40. Both sense coils are tied to a voltage $V_{cc}$. Operational amplifier 44A represents part of the 4 pole bandpass filter which is referenced or biased by $V_{cc}$. Operational amplifier 44 represents the amplifier in the integrator 26 (which is referenced to $V_{cc}$) and is coupled to operational amplifier 46, which represents the summing amplifier 30, through resistance $R_1$. Note that each of the 4 pole bandpass filters 44A and 44 and the integrator has a bias voltage that is referenced to $V_{cc}$ (same as the coil). Operational amplifier 48, which represents the amplifier in the ranging circuit 28, is also coupled to the input of the amplifier 46 through resistance $R_2$. The output of the operational amplifier 46 is fed back to the sense coil 42 through a feedback resistor $R_f$. The feedback current is represented as I. Series coil resistance is represented by $R_c$.

The effectiveness of the circuit 40 in compensating for large vehicle magnetic fields is determined by the incremental change in feedback current $\Delta I$ produced for each incremental change in the output voltage $\Delta V_c$ of the operational amplifier 48, and the maximum allowable feedback current per coil $I_{max}$. From the circuit 40 of FIG. 5, the voltage $\bar{V}$ can be calculated as follows:

$$V = \frac{V_o R_2}{R_1 + R_2} + \frac{V_c R_1}{R_1 + R_2} \tag{1}$$

and $$V + \Delta V = \frac{V_o R_2}{R_1 + R_2} + \frac{(V_c + \Delta V_c) R_1}{R_1 + R_2} \tag{2}$$

Therefore, $$\Delta V = \frac{\Delta V_c R_1}{R_1 + R_2} \tag{3}$$

Since $\Delta V = \Delta I (R_f + R_c)$, \hfill (4)

$$\Delta I = \frac{\Delta V_c R_1}{(R_1 + R_2)(R_f + R_c)} \tag{5}$$

Since $V_{cc}$ is fixed to 0.5 $V_a$, $$I_{max} = \frac{V_a - V_{cc}}{R_f + R_c} = \frac{.5 V_a}{R_f + R_c} \tag{6}$$

Figure 7:
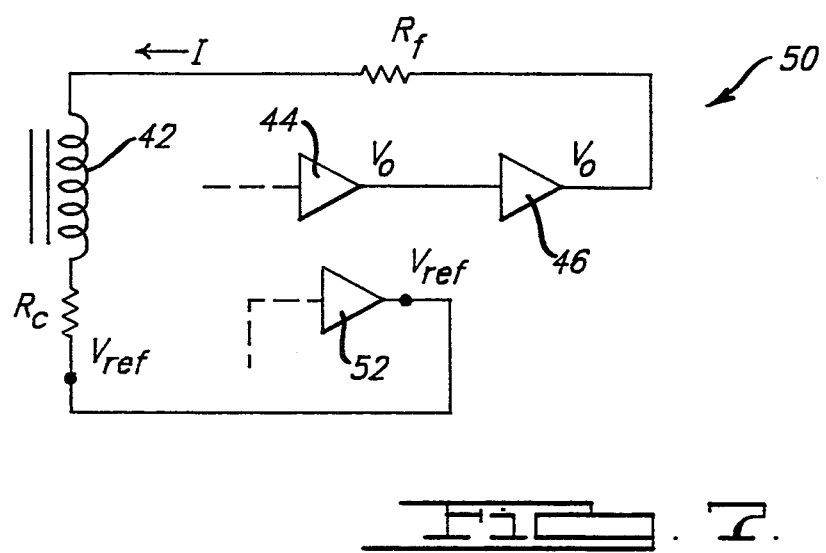
FIG. 7 is a simplified schematic diagram of the compensation circuit and connection of the present invention.

In FIG. 7 there is shown the improved compensation circuit 50 of the present invention. The sense coil 42 of the flux-gate 18, the bias voltages of the 4 pole bandpass filter 22 and the integrator 26 are now tied to a floating or shifting reference voltage $V_{ref}$ which is produced by the operational amplifier 52, corresponding to operational amplifier 48 of 6. The operational amplifier 44 and the operational amplifier 46 are unchanged, as well as the feedback path through $R_f$. The operational amplifier 46, corresponding to amplifier 32 of 4, can be kept as an additional amplifier or eliminated.

The effectiveness of the compensation circuit 50 of the present invention can be determined from the schematic in FIG. 7:

$$I = \frac{\vec{V} - V_{ref}}{R_f + R_c} \tag{7}$$

and $$I + \Delta I = \vec{V} - \frac{(\vec{V}_{ref} + \Delta \vec{V}_{ref})}{R_f + R_c} = \frac{\vec{V} - \vec{V}_{ref}}{R_f + R_c} - \frac{\Delta \vec{V}_{ref}}{R_f + R_c} \tag{8}$$

therefore, $$\Delta I = \frac{\cdot \Delta V_{ref}}{R_f + R_c} \tag{9}$$

since $V_{ref}$ and $V_o$ can be any voltage from 0 to $V_a$, $$I_{max} = \frac{V_o - V_{ref}}{R_f + R_c} = \frac{V_a}{R_f + R_c} \quad (10)$$

A comparison of the compensation circuits 40 and 50 in FIG. 6 and FIG. 7 reveals that the circuit in FIG. 7 is much more effective. By comparing equations 5 and 9, the incremental change in feedback current ΔI for every incremental change in voltage output $\Delta V_{ref}$ is greater than the incremental change in feedback current ΔI for every incremental change in voltage output $\Delta V_c$ by a factor $$\frac{R_1 + R_2}{R_1}.$$

Resistor $R_2$ cannot be made zero in order to equate the effects of the two compensation circuits 40 and 50, since this would cause $V_c$ to be the single forcing function or voltage feeding current through the feedback loop into the sense coil 42 of the flux-gate 18, and would thereby prevent the signal from the integrator 26 from contributing to the feedback. This would make the electronic compass 10 inoperable because there would be no varying of the DC levels from which the microcomputer 12 could calculate heading information.

A comparison of the maximum feedback currents in each of the two compensation circuits 40 and 50 also shows that the compensation circuit 50 of the present invention is more effective. From equations 6 and 10, the maximum feedback current $I_{max}$ of the present invention is twice as great as the maximum feedback current of the compensation circuit 40 in FIG. 6. Therefore, the present invention can compensate for sensed magnetic fields twice as strong. Advantageously, the present invention makes calibration under the method of the '462 patent possible for abnormally large vehicle magnetic fields.

Another advantage of the compensation circuit 50 of the present invention is that it moves the earth's magnetic field circle 36 totally within the window 34 without reducing the radius $\vec{R}$ of the earth's magnetic field circle 36. Compensation is accomplished by shifting the origin O of the vehicle's magnetic field voltage vector $\vec{V}$. In the compensation circuit 40 of FIG. 6, the origin O of the vehicle's magnetic field voltage vector $\vec{V}$ is held at $V_{cc}$ and compensation is produced by decreasing the magnitude of the vehicle's magnetic field voltage vector $\vec{V}$. The resolving power of the analog-to-digital converter 14 determines the maximum current that will permit resolution of the earth's magnetic field voltage vector $\vec{R}$. In the compensation circuit 50 of the present invention, the trade-off between increased feedback current I and decreased resolving power are not present because the vector magnitude of the $\vec{R}$ remains the same.

Finally, unlike the compensation circuit 40 of Hormel, the compensation circuit 50 of the present invention allows the DC output levels, $V_{ox}$ and $V_{oy}$, to be sampled from the output of the buffer amplifier 32. This effectively places tile buffer amplifier 32 outside the feedback loop. The summing amplifier 30 is within the feedback loop of the compensation circuit 40; therefore, minor variations in output current due to temperature variations become magnified and represent a source of error.

The present invention can be easily implemented by merely connecting the output of the ranging circuit 28 to the common junction of the sense coils of the flux-gate 18, the 4 pole bandpass filter bias point and the integrator bias point. However, the present invention is not limited to vehicles and is not bound by the usage of a multiplexing scheme. As shown in FIG. 8, the sensed magnetic field in each coil may be processed separately, using bandpass filters 62 and 63, synchronous detectors 64 and 65, integrators 66 and 67, ranging circuits 68 and 69, feedback resistances $R_{fx}$ and $R_{fy}$ and buffer amplifiers 70 and 71. The sense coils are not tied to a common junction. Also, the ranging circuit could be any type of circuit that generates a variable output voltage that is controlled by a microcontroller or other controlling circuit, such as pulse width modulation circuits.

Although the invention has been described with particular reference to certain preferred embodiments thereof, variations and modifications can be effected within the spirit and scope of the following claims.

What is claimed is:

1. In a control circuit for an electronic compass which includes a microcomputer, a flux gate having first and second sense coils each producing an output signal dependent upon sensed strengths of the earth's magnetic field and of a magnetic field associated with a vehicle upon which the flux gate is mounted, and an integrator having a fixed output voltage range, a shifting compensation circuit for bringing the output voltage of integrator within the fixed, allowable output voltage range of said integrator, the shifting compensation circuit comprising:

a ranging circuit coupled between said microcomputer and said flux gate;

said ranging circuit including a variable direct voltage source, said microcomputer directing said variable direct voltage source to add a designated direct voltage reference in opposition to a signal due to the vehicle's magnetic field, and within said fixed output voltage range of said integrator, to the output signal of the flux-gate.

2. The control circuit as recited in claim 1, further comprising a multiplexer for scheduling the output of said integrator output between said first and second sense coils.

3. The control circuit as recited in claim 2, wherein said ranging circuit is connected to a common junction of said first and second sense coils, said ranging circuit being scheduled between said first and second sense coils by said multiplexer.

4. The control circuit as recited in claim 1, wherein said ranging circuit further comprises a first ranging circuit coupled between said microcomputer and said first sense coil and a second ranging circuit coupled between said microcomputer and said second sense coil.

5. The control circuit of claim 1, wherein said first sense coil includes a first bandpass filter associated therewith and said second sense coil includes a second bandpass filter associated therewith; and said integrator includes first and second integrators, said first integrator being associated with said first sense coil and said first bandpass filter, and second integrator being associated with said second sense coil and said second bandpass filter.

6. The shifting compensation circuit of claim 1, wherein said variable direct voltage source enables said ranging circuit to bring combined said earth and vehicle magnetic fields within said fixed output voltage range of said integrator for all vehicle headings.

7. The shifting compensation circuit as recited in claim 1, further comprising a buffer amplifier coupled between the output of said integrator and said microcomputer, the output of said buffer amplifier being fed back to said first and second sense coils through only a feedback resistance to thereby stabilize the output of the integrator and to scale said output so as to make said output directly proportional to said combined measured magnetic fields of the earth and said vehicle.

* * * * *

UNITED STATES PATENT AND TRADEMARK OFFICE
CERTIFICATE OF CORRECTION

PATENT NO. : 5,353,241

DATED : October 4, 1994

INVENTOR(S) : Rafi A. Al-Attar

It is certified that error appears in the above-identified patent and that said Letters Patent is hereby corrected as shown below:

ON THE TITLE PAGE, under Inventor insert --Assignee: CHRYSLER CORPORATION, Highland Park, MI.--.

ON THE TITLE PAGE, under Assistant Examiner insert --Attorney, Agent, or Firm - Mark P. Calcaterra--.

Signed and Sealed this

Twenty-fourth Day of January, 1995

*Attest:*

BRUCE LEHMAN

*Attesting Officer*      *Commissioner of Patents and Trademarks*